United States Patent

[11] 3,618,876

[72] Inventors Wallace E. Skidmore
 Redmond;
 Bjarne E. Syltebo, Bellevue; Wilton S. Viall, Des Moines; Peter C. Abeel, Kent, all of Wash.
[21] Appl. No. 887,180
[22] Filed Dec. 22, 1969
[45] Patented Nov. 9, 1971
[73] Assignee The Boeing Company
 Seattle, Wash.

[54] AIRCRAFT ENGINE LEADING EDGE AUXILIARY AIR INLET
 3 Claims, 7 Drawing Figs.
[52] U.S. Cl. .................................................. 244/53 B, 137/15.1
[51] Int. Cl. ....................................................... B64d 29/00
[50] Field of Search ........................................... 244/53.8; 137/15.1, 15.2; 60/39.26, 226

[56] References Cited
UNITED STATES PATENTS
3,222,863 12/1965 Klees et al. ................... 244/53 B
3,446,223 5/1969 Hancock ....................... 137/15.2
FOREIGN PATENTS
1,125,773 1962 Germany ...................... 244/53 B Primary Examiner—Milton Buchler
Assistant Examiner—Steven W. Weinrieb
Attorneys—Glenn Orlob and Bernard A. Donahue ABSTRACT: A primary and an auxiliary inlet system for an aircraft jet engine. A rigid leading edge ring pivotally supports exterior and interior foil members which in a first position provide a portion of the cowling forebody fairing and which in a second position coact to provide one wall of an auxiliary inlet. The foils are spring-biased into their first positions for cruise flight and are responsive to aerodynamic pressures caused by changing flight conditions to pivot into said second position for low-speed flight and takeoff conditions.

INVENTORS:
WALLACE E. SKIDMORE
BJARNE E. SYLTEBO
WILTON S. VIALL
PETER C. ABEEL

BY
Bernard A. Donahue
ATTORNEY

PATENTED NOV 9 1971 3,618,876

INVENTORS:
WALLACE E. SKIDMORE
BJARNE E. SYLTEBO
WILTON S. VIALL
PETER C. ABEEL
BY

Bernard A. Donahue
ATTORNEY

AIRCRAFT ENGINE LEADING EDGE AUXILIARY AIR INLET

BACKGROUND OF THE INVENTION

This invention relates to nacelle air inlet systems for aircraft and, more particularly, to an axisymmetric pitot-type inlet with a variable geometry primary intake and an auxiliary passageway.

During high-speed flight a thin sharp entry lip of minimum diameter is desirable to minimize nacelle drag. Such an entry lip is adequate to supply a sufficient quantity of air to the engine during high-speed flight because of the ramming effect due to the velocity of the aircraft. However, such a minimum diameter thin entry lip will not give adequate performance during takeoff and low-speed flight when the engine demands a large airflow under full power conditions. For takeoff and low-speed conditions a large diameter fat entry lip of a bellmouth type is ideal to prevent lip loss turbulence and loss of boundary layer control in the primary passageway.

Auxiliary intake passages of the type located aft of the lip area of the cowling and opening near the engine fan face have been used to increase air intake during low-speed flight. However, such aft located auxiliary passages do not operate effectively when used with inlets having thin entry lips.

In the design of pitot-type inlets, the highlight diameter is defined as the diameter measured to the points where the lip leading edge slopes are normal to the inlet centerline. The inlet throat is located where minimum duct flow occurs. Lip area ratio provides a measure of lip thickness and is defined as $A_{hl}/A_{th}$ where $A_{hl}$ is the area of the inlet highlight and $A_{th}$ the area of the inlet throat. Conventional aft located auxiliary passageways usually require lip area ratios of 1:18 or higher to operate effectively. Such high lip area ratio inlets generate undesirable drag penalties for subsonic aircraft having high cruise velocities.

In the design of an aircraft engine air intake system inlet pressure recovery is a significant parameter which is defined as $P_{T2}/P_{T\infty}$ where $P_{T2}$ is the total pressure at the engine face and $P_{T\infty}$ is the freestream total pressure. For an optimum inlet design, minimum pressure recovery under crosswind conditions at takeoff power should be 97 percent; pressure recovery must approach 100 percent below 100 knot airplane velocity at takeoff power. Recovery losses during climb and cruising flight are intolerable.

SUMMARY OF THE INVENTION

In accordance with the foregoing, it is an object of this invention to provide an inlet having a highlight area sized for high-speed flight which can be efficiently utilized for takeoff and low-speed operation.

A related object of this invention is to provide a leading edge auxiliary intake passageway which is responsive to air pressures acting on the inside and outside of the engine nacelle cowling so as to be entirely automatic in operation.

A further objective of this invention is to provide an inlet with a leading edge auxiliary air passageway of aerodynamically clean design which in addition to supplying auxiliary air is effective to provide boundary layer control in the primary inlet passageway.

A further object is to provide acoustic damping of noise generated by the passage of auxiliary air into the engine.

The above objectives are achieved in this invention by the provision of a plurality of pivotable foil members near the leading edge of the forward engine cowling and mounted on a rigid structural leading edge ring. Exterior foil members form a portion of the external shape of the cowling during cruise flight and are responsive to aerodynamic pressures to pivot to a position establishing the inlet for an auxiliary passageway during low-speed operation. Interior foil members form a fairing of the inside cowling during cruise and are responsive to aerodynamic pressures to pivot to cooperate with the exterior foils in forming an aerodynamically clean leading edge auxiliary air passageway which directs air longitudinally along the wall of the primary inlet for boundary layer control and acoustical damping.

BRIEF DESCRIPTION OF THE DRAWINGS

FIG. 1 provides an isometric view of the forward portion of an aircraft engine nacelle inlet structure incorporating a series of inlet lip vanes constructed according to the teachings of this disclosure. A fan jet engine cowling 10 is shown to have a leading edge lip 12 surrounding a turbine centerbody fairing 14. Strut members 16 provide a structural continuation of the fan cowling 10 and support a structural ring 18 which in turn pivotally receives interior foil sections 20 and exterior foil sections 21. In the cruise flight condition shown In FIG. 1, the exterior foils 21 fair into the smooth aerodynamic shape established by cowling 10 and the struts 16. The interior foils 20 likewise fair into the internal inlet shape established by the cowling and strut inlet structure.

FIG. 2 shows the FIG. 1 inlet structure in a position for low-speed flight wherein the exterior foils 21 and interior foils 20 have been pivotally displaced by aerodynamic pressures acting on the external and internal surfaces of the cowling. In this position auxiliary air passageways are formed by each coacting pair of foils 20 and 21 in combination with an internal surface of the cowling. The foils are spring-biased to react to predetermined pressure conditions to pivot into a position to form one wall of an aerodynamically clean passageway to admit air which would otherwise pass over the exterior cowling surface.

FIG. 3 is a schematic cross-sectional view of a fan jet forward cowl incorporating exterior foils 21 and interior foils 20 positioned for cruise flight operation. The inlet throat diameter $T_H$ is measured where minimum duct flow occurs. For high cruise speed subsonic aircraft such as are contemplated for the preferred embodiment of this invention, the lip area ratio ($A_{hl}/A_{th}$ as previously defined) is preferably of the order of 1:09 or less in order to minimize cruise drag penalties.

FIG. 3 depicts an engine installation and fan cowl comprising a forebody portion 30, a boattail portion 32, support struts 34, and a fan 36. It is to be noted that in the position shown, the exterior foil 21 provides a smooth continuous fairing between the leading edge ring 18 and the outer surface of the cowl. Similarly, the interior foil 20 provides an interior inlet fairing which extends from the leading edge ring to the central portion of the forebody 30.

FIG. 4 shows the exterior foil 21 and interior foil 20 after they have been pivoted into position for low-speed flight. Under the influence of differential pressures acting on the cowl forebody 30, the foil members 21 have pivoted such that they now define a portion of the wall of an auxiliary passageway. The foils 20 have likewise responded to pressure differentials to pivot to coact and combine with foils 21 to form a continuation of an aerodynamically clean auxiliary passageway. The outer foil portions 40 and 42 define the forward surface of an auxiliary air passageway which will direct auxiliary air aft and outwardly along the inner wall 43 of the cowl forebody. An interior surface 44 of forebody 30 provides the aft wall of the auxiliary passageway. The passageway so defined is preferably continuously converging in area and the surfaces 40 and 42 designed to draw an optimum auxiliary airflow and redirect it aft and outwardly along a substantial length of the cowl interior forebody. With a leading edge auxiliary passageway constructed in this manner, airflow control is exercised over a maximum length of intake duct ahead of the fan face. As will now be apparent to persons skilled in this art, such maximum length flow control may be utilized for the purpose of increasing the primary inlet duct efficiency through boundary layer control and for maximizing the acoustic dampening benefits attainable through the use of a maximum length acoustic liner on the inner wall 43 of cowl forebody 30.

Figure 3:
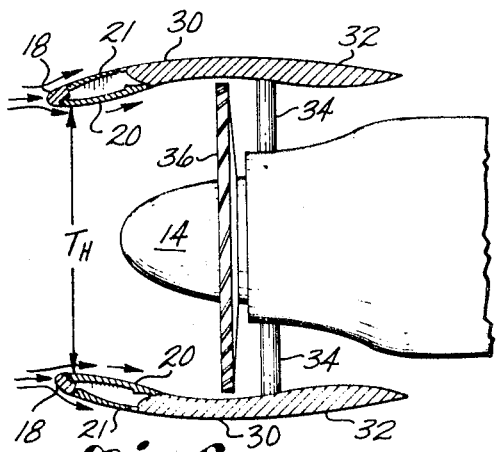
FIG. 3 is a cross-sectional view of a high bypass ratio front fan engine cowling incorporating the inlet of FIGS. 1 and 2 and shown in a high-speed flight condition.
Figure 4:
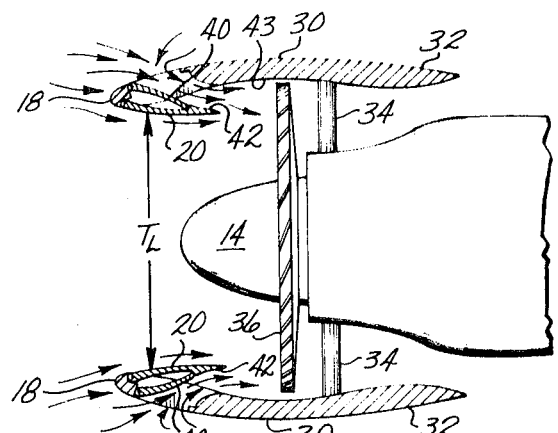
FIG. 4 is a cross-sectional view similar to FIG. 3 showing the inlet in the low speed or takeoff flight condition.

Is is to be noted that in the FIG. 4 low-speed inlet position, the plane of minimum duct flow, as defined by the throat diameter $T_L$, has shifted slightly aft with respect to the corresponding plane of FIG. 3. The FIG. 4 lip area ratio has increased over the FIG. 3 position because of a decrease in the throat diameter from $T_H$ to $T_L$. The FIG. 4 primary inlet is approaching a classic bellmouth shape, with lip turbulence losses during low-speed operation reduced to an acceptable level.

Figure 5:
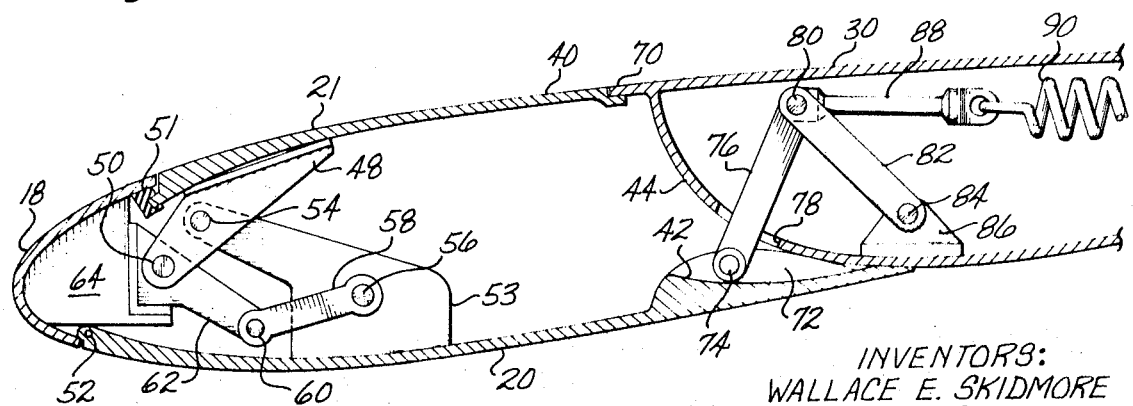
FIG. 5 is a detailed cross-sectional view of the inlet foil members disposed for high-speed flight.

FIG. 5 is an expanded cross section view of the cowl forebody showing the exterior foil 21 and interior foil 20 positioned for cruise flight. The foil 20 includes an aft portion 42. Foil 21 is pivotally mounted on ring 18 at point 50 and sealed at 51 while foil 20 is pivotally mounted at point 54 and sealed at 52. The two foils are physically interconnected by conventional mechanical linkages 48 through 62 for concurrent but unequal movement into their respective positions for cruise and low-speed flight. Obviously, if the two foils are interconnected by linkages, then a single biasing system will be sufficient for both foils. An axial tension spring-biasing system is shown to be attached to a lug 72 of the interior foil 20 at point 74. A member 76 extends from point 74 through a slot in wall surface 44. Member 76 is connected to a pivot point 80. A member 82 is pinned at 80 and attached at 84 to a grounding bracket 86 which is rigidly affixed to the forebody structure. An axial tension spring 90 is anchored in aft cowl structure (not shown) and is connected to point 80 by means of a fitting 88.

It will readily be apparent that in the system shown in FIG. 5, the preload of spring 90 may be set at any desired predetermined value to cause movement of the foil sections in response to a particular value of pressure differential acting on the cowl structure.

Figure 6:
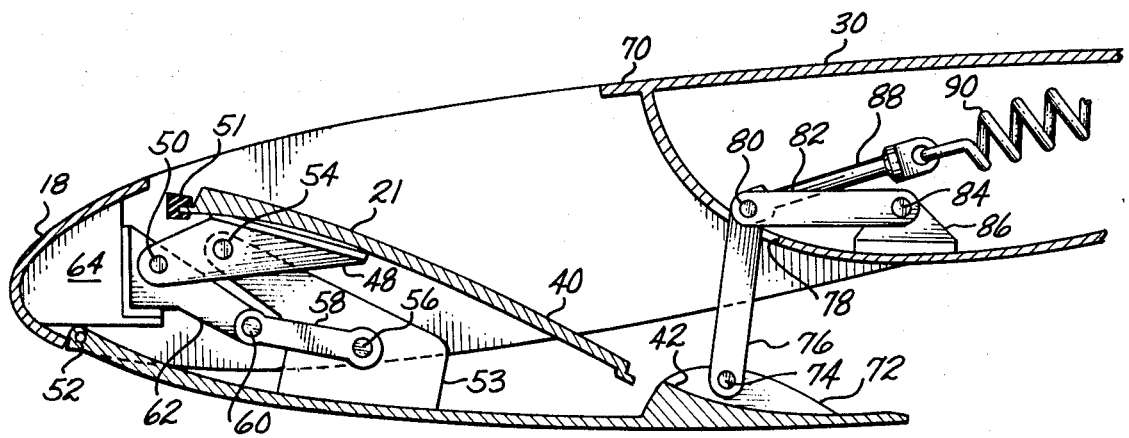
FIG. 6 is a view similar to FIG. 5 with the foils shown in the low speed or takeoff position.

FIG. 6 is a view similar to FIG. 5, with the foils shown in their low-speed flight positions. Foil 21 has been pivotally displaced about point 50 to a position where it forms a wall of the auxiliary passageway. The interior foil 20 has been displaced about point 52 into its low-speed position as controlled by stop means (not shown) associated with the linkage mechanism.

The combined ring and foil system 18, 20 and 21 can be seen in FIG. 6 to present a generally unitary airfoil section in which the interior surface approaches the classic bellmouth shape which is ideal for prevention of lip turbulence losses. Because of the pivoting of foil 20 the primary intake throat diameter is effectively reduced slightly and the plane of minimum duct flow is moved aft. The exterior surfaces 40 and 42 combine with surface 44 to form an aerodynamically clean and gradually converging auxiliary air passageway. It is to be noted that the exterior surface 42 of foil 20 changes the direction of flow of the auxiliary air to direct it generally longitudinally aft along the inner wall 43 where it can be exposed to acoustic dampening materials and used for boundary layer control in the main inlet passageway.

Figure 7:
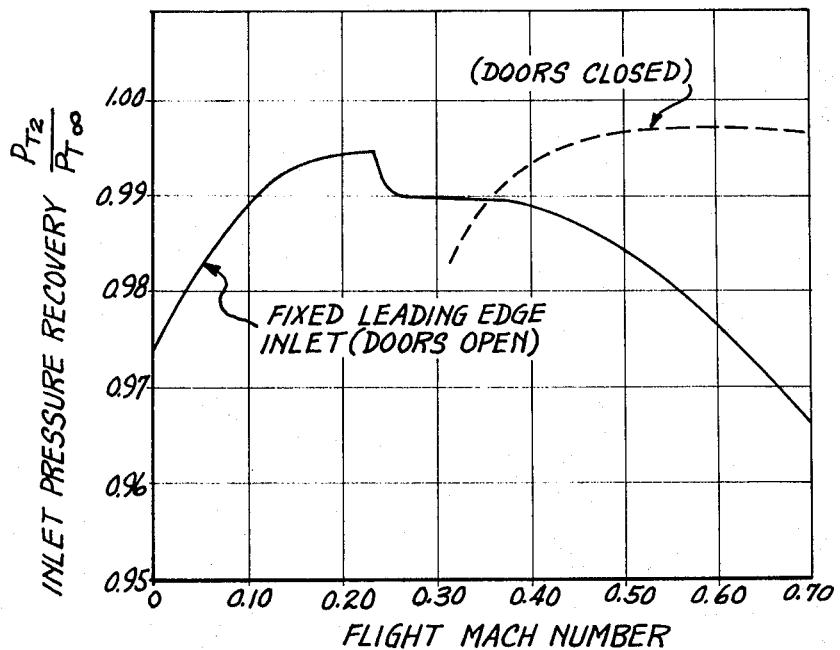
FIG. 7 is a plot of inlet pressure recovery vs. flight Mach number which is attainable with the inlet of this invention.

FIG. 7 illustrates wind tunnel test data on engine face pressure recovery during takeoff, rotation, and climb-out on an inlet system constructed according to the teachings of this disclosure. From the intersection of the "doors open" and "doors closed" curves, the desired door-closing Mach number is determined for the purpose of establishing biasing system design forces. The air pressure loads tending to actuate the foils in flight may be computed approximately by taking into account such diverse factors as local velocities, angle of attack, and mechanical friction. However, wind tunnel and flight testing should be conducted using foils which are instrumented with surface pressure taps and strain gages. Using data from such instrumentation, hinge moment calculations may be used to determine the spring-biasing force necessary to close the doors.

Figure 1:
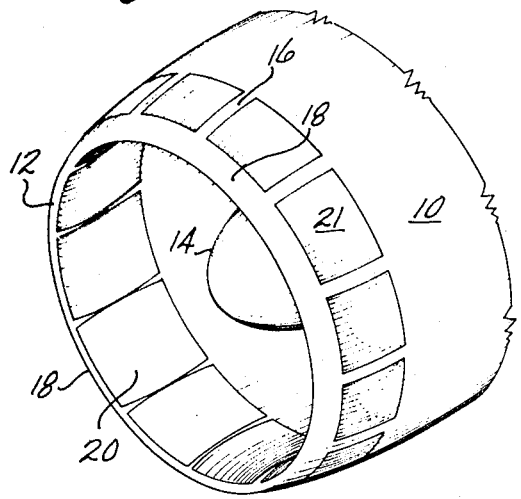
FIG. 1 is a fragmented isometric view of an aircraft engine inlet constructed according to this disclosure and shown in the high-speed flight condition.
Figure 2:
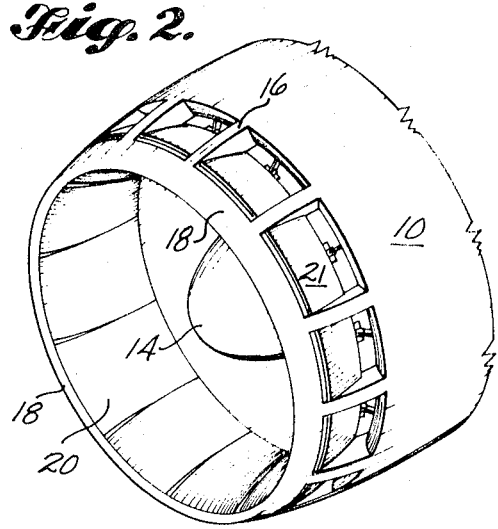
FIG. 2 is a showing of the inlet of FIG. 1 in the low speed or takeoff flight condition.

The inlet pressure recovery levels shown in FIG. 1 are to be regarded as typical and developmental in nature. For example, considerable improvement can be, and has been, obtained in the low Mach number (below 0.10) "doors open" values shown by optimizing design and shaping parameters.

In light of the foregoing, it will be apparent to persons skilled in this art that the disclosed system will be effective to alleviate engine surge conditions during low-speed flight. This effectiveness is due in large measure to the bellmouth shape of the primary entry and the efficiency of the auxiliary air passageway in directing air for boundary layer control. In contrast to most prior art inlet schemes, the system disclosed is particularly effective in maintaining reasonably even pressure distribution at the fan face during crosswind conditions.

It should be noted that while the preferred embodiment discussed above has utilized pressure-actuated foils, or doors, for purposes of obtaining simple and foolproof automatic operation, that foils of the type here disclosed could be power actuated to obtain similar inlet efficiency benefits. Power actuation would of course be heavier, more costly and more subject to malfunction. However, in certain design situations, such as extremely large design forces, or high engine sensitivity to surge, it may be desirable or necessary to use such power actuation in spite of its inherent penalties. To modify the preferred embodiment disclosed here to obtain a powered system would of course require no more than the proper location of power actuators at appropriate points in the support and linkage mechanisms shown. A control system for a powered actuation system could be made responsive to sensed aerodynamic pressures or to aircraft flight parameters, with suitable provision for manual override.

What is claimed is:

1. A primary and an auxiliary inlet system for the forward cowling forebody of an aircraft power plant comprising: a continuous leading edge structural ring which defines the inlet highlight area and extends aft a distance less than the maximum thickness of said forebody, and exterior foil pivotally mounted with respect to said ring and which forms a portion of the exterior surface of said forebody in a first position, an interior foil pivotally mounted with respect to said ring and which forms a portion of the interior surface of said forebody in a first position, wherein said exterior and interior foils are mechanically biased into said first positions and are responsive to changing flight conditions to move from said first positions to second positions wherein they coact to form one wall of a continuously converging auxiliary air passageway which directs auxiliary air longitudinally aft and outwardly along the interior wall of said forward cowling for boundary layer control, and wherein said interior foil pivots inwardly toward the centerline of said cowling about a point located near its forward edge to its second position wherein it effectively reduces the throat diameter of said primary inlet and cooperates with said structural ring to provide a bellmouth-shaped surface having a continuously negative rate-of-change of slope from its forward edge to its aft end where the slope of said surface approaches a parallel to the centerline of said cowling.

2. The inlet of claim 1 wherein said foils are responsive to aerodynamic pressure to move against the mechanical biasing from said first positions into said second positions.

3. The inlet of claim 1 wherein said interior and exterior foils are interconnected by mechanical means for causing concurrent movement at the two foils.

* * * * *